United States Patent
Dreps et al.

(10) Patent No.: US 6,442,223 B1
(45) Date of Patent: Aug. 27, 2002

(54) METHOD AND SYSTEM FOR DATA TRANSFER

(75) Inventors: Daniel Mark Dreps, Georgetown, TX (US); Frank David Ferraiolo, Essex, VT (US); Kevin Charles Gower, LaGrangeville, NY (US); Toru Kobayashi, Saitama (JP); Bradley David McCredie, Austin, TX (US); Hideo Sawamoto, Asahimachi (JP)

(73) Assignees: International Business Machines Corporation, Armonk, NY (US); Hitachi, Ltd., Tokyo (JP)

( * ) Notice: Subject to any disclaimer, the term of this patent is extended or adjusted under 35 U.S.C. 154(b) by 0 days.

(21) Appl. No.: 09/299,716

(22) Filed: Apr. 26, 1999

(51) Int. Cl.[7] ................................................. H04L 7/00
(52) U.S. Cl. ...................................................... 375/354
(58) Field of Search ................................. 375/354, 364, 375/373, 376, 219; 709/236, 237, 233, 232, 200, 203; 370/538, 532, 536, 350, 503

(56) References Cited

U.S. PATENT DOCUMENTS 4,987,572 A * 1/1991 Scott ........................... 370/538
6,233,238 B1 * 5/2001 Romanowski et al. ... 348/423.1
6,253,245 B1 * 6/2001 Helbig ........................ 709/232

* cited by examiner

Primary Examiner—Chi Pham
Assistant Examiner—Khai Tran
(74) Attorney, Agent, or Firm—Anthony V. S. England; Bracewell & Patterson, L.L.P.

(57) ABSTRACT

A method and system for increasing speeds of transferring data in a data transfer system which includes a data source and data sink. Both the data source and data sink include clocks which are synchronized to a common clock frequency. A buffer is provided at the data sink and this buffer is utilized to received data from the data source. A control circuit is provided at the data sink and this control circuit receives a bus clock signal from the data source. An N segment dynamic shift register is provided within the data sink which includes at least two segments. A selectable shift control is provided for passing the data through an M segment subset of the N segment shift register, where M is less than N. Additionally, the length of the M segment subset is determined by the phase of a clock within the data sink at the time which the bus clock signal from the data source is received at the data sink. By selectively passing the data through an M segment subset of the N segment shift register, the data is accessible at the data sink at a controllable predetermined time.

17 Claims, 14 Drawing Sheets

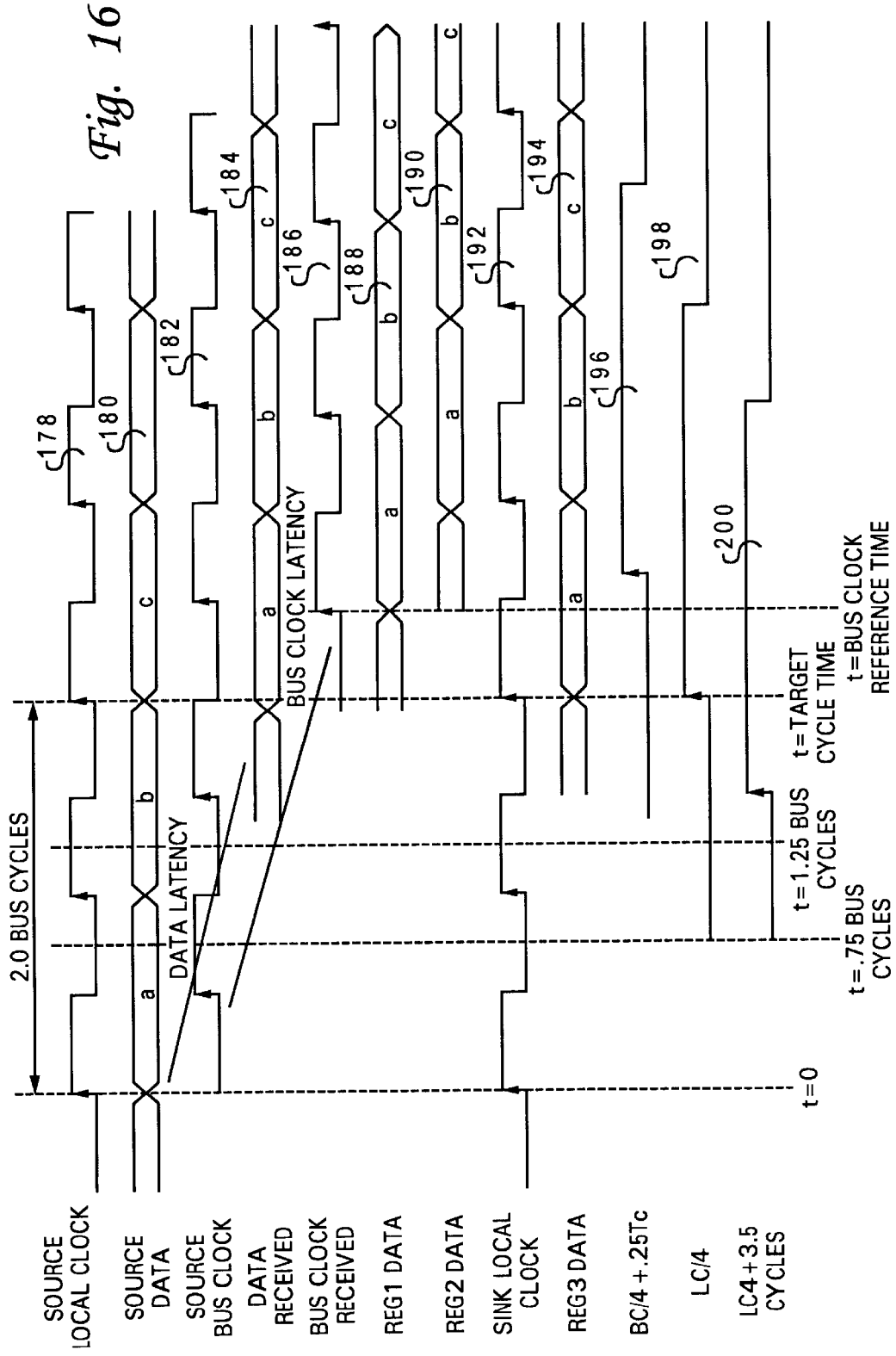

METHOD AND SYSTEM FOR DATA TRANSFER

BACKGROUND OF THE INVENTION

1. Field of the Invention

The present invention relates in general to a data transfer system and in particular to high frequency transfer of data between a data source and a data sink. Still more particularly, the present invention relates to a method and system for processing data received at the data sink over a wide range of bus cycles such that the data is accessible to the data sink at a controllable predetermined time.

2. Description of the Related Art

In transferring data from a data source which supplies data to a data sink which receives data, it is typically preferred that the speed of data transfer is as fast as possible. Factors that typically limit the speed of data transfer are the latency of the interface between the data source and the data sink and the requirements of cycle synchronization and deterministic transfer of data.

The latency of the interface between the data source and the data sink represents the time required for data to pass from the data source to the data sink. In determining the latency of an interface, typically the worst case slow path is analyzed. The worst case slow path determines the longest time that data may take to pass from the data source to the data sink. Several factors adding time to the worst case slow path may be the process time of the data source, high temperatures, low voltage, and the clock skew between the data source and the data sink. Additionally, in determining the latency of the interface, typically, the best case fast path is analyzed. The best case fast path determines the shortest time that data may take to pass from the data source to the data sink. By determining both the fast path and the slow path, a range of time during which the data can be expected to arrive at the data sink may be determined.

Cycle synchronization requires that, depending upon the bus cycle during which the data is transmitted from the data source, there is a specified bus cycle during which the data will be received at the data sink. For example, if data is transmitted at a first bus cycle, cycle synchronization for the system may specify that the data must be received at the data sink during a second bus cycle. Thereby, if the data is not received at the data sink until a third bus cycle, cycle synchronization is not maintained.

Deterministic transfer of data requires that the data will be available at the data sink for use or storage at a predetermined bus cycle. The predetermined cycle during which the data is available is typically at least one bus cycle after the bus cycle during which the data is received.

Deterministic transfer of data and cycle synchronization are crucial in a data transfer system in order to maintain the complex structure and orderly execution of instructions. In most cases, data malfunctions result if the data is received at the data sink before or after the bus cycle during which the data is expected.

Referring now to FIG. 1, a prior art data transfer system timing diagram is depicted wherein the bus cycle time is longer than the worst case latency. A data source bus clock is illustrated at reference numeral 200 where a first complete cycle of the data source bus clock is between time=0 and time=target cycle time and where the data is expected to be deterministically available at the bus cycle after the target cycle time. Data source data is depicted at reference numeral 202 which provides the data for the data sink to receive. The first data (a) received at the data sink is illustrated at reference numeral 204 arriving within the bus cycle that the data is transmitted, at a period of time after being transmitted. The period of time between when the first data (a) is transmitted at reference numeral 202 and received at reference numeral 204 is the latency across the interface. Second data (b) is transmitted during the second bus cycle at reference numeral 202 and received at reference numeral 204 during the second bus cycle after a period of time equal to the latency of the interface. A data sink local clock, which is at the same frequency and phase as the data source bus clock, is depicted at reference numeral 206. At the rising edge of the data sink local clock at time=target cycle time, the first data (a) becomes accessible at the data sink as illustrated at reference numeral 208. Thereby, if a new data element is transmitted, the data is guaranteed to be received during the bus cycle that the data is transmitted and accessible at the next bus cycle for use or storage at the data sink.

The prior art data transfer system depicted in FIG. 1 maintains cycle synchronization by always receiving data at the bus cycle during which the data is transmitted. Deterministic transfer is maintained because the data is always available at the data sink the bus cycle after the data is received.

However, while the prior art data transfer system maintains the requirements of cycle synchronization and deterministic transfer of data, the speed of transfer of each data element to the data sink is limited by the worse case latency time.

The need to increase the speed of data transfers between functional units is driving the development of improved methods of data transfer where it is contemplated that data may arrive over a range of bus cycles, and that interface latency exceeds bus cycle time.

A need exists for a method and system which permits high speed data transfer and maintains deterministic data transfer and cycle synchronization while allowing data to arrive over a range of bus cycles.

SUMMARY OF THE INVENTION

It is therefore one object of the present invention to provide a data transfer system.

It is another object of the present invention to provide high frequency transfer of data between a data source and a data sink.

It is yet another object of the present invention to provide an improved method and system for shifting data received at the data sink over a wide range of bus cycles such that the data is accessible to the functional unit at a controllable predetermined time.

The foregoing objects are achieved as is now described. A method and system of the present invention may be utilized to transfer data between the data source and the data sink. Both the data source and data sink include clocks which are synchronized to a common clock. A buffer is provided at the data sink and this buffer is utilized to received data from the data source. A control circuit is provided at the data sink and this control circuit receives a bus clock signal from the data source. An N segment dynamic shift register is provided which includes at least two segments. A selectable shift control is provided for passing the data through an M segment subset of the N segment shift register, where M is less than N. Additionally, the length of the M segment subset is determined by the phase of a clock within the data sink at the time which the bus clock signal from the data source is received at the data sink. By selectively passing the data through an M segment subset of the N segment shift register, the data is accessible at the data sink at a controllable predetermined time.

The above as well as additional objects, features and advantages of the present invention will become apparent in the following written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 16 illustrates a timing diagram of the dynamic shift register operation of FIG. 11 where data is received in a third phase.

DESCRIPTION OF THE PREFERRED EMBODIMENT

As previously stated, improved data transfer is contemplated wherein interface latency exceeds bus cycle time. A data transfer method under such conditions is referred to herein as "wave-pipelining" or "bus pumping."

Figure 1:
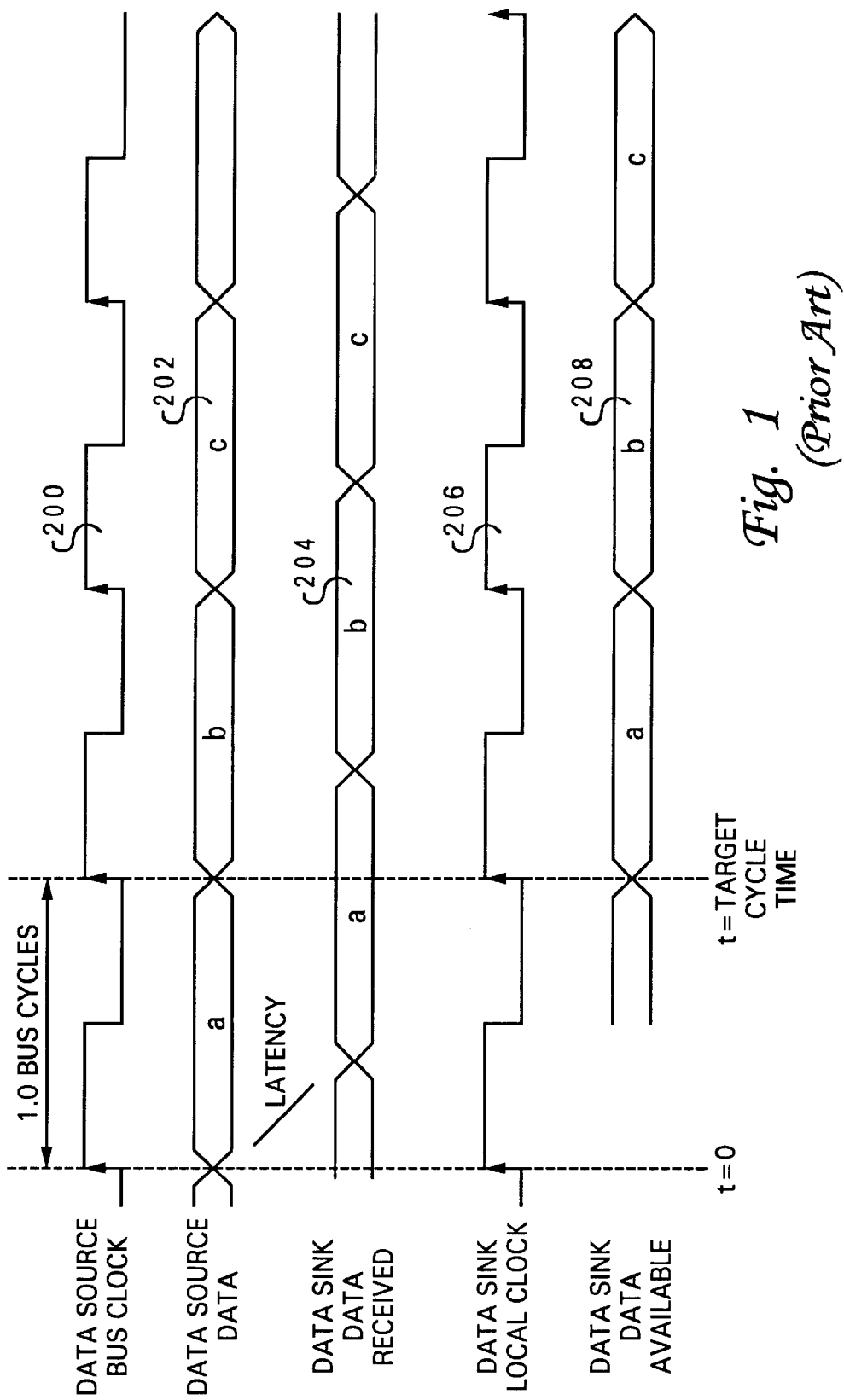
FIG. 1 depicts a timing diagram of a prior art method of transferring data.
Figure 2:
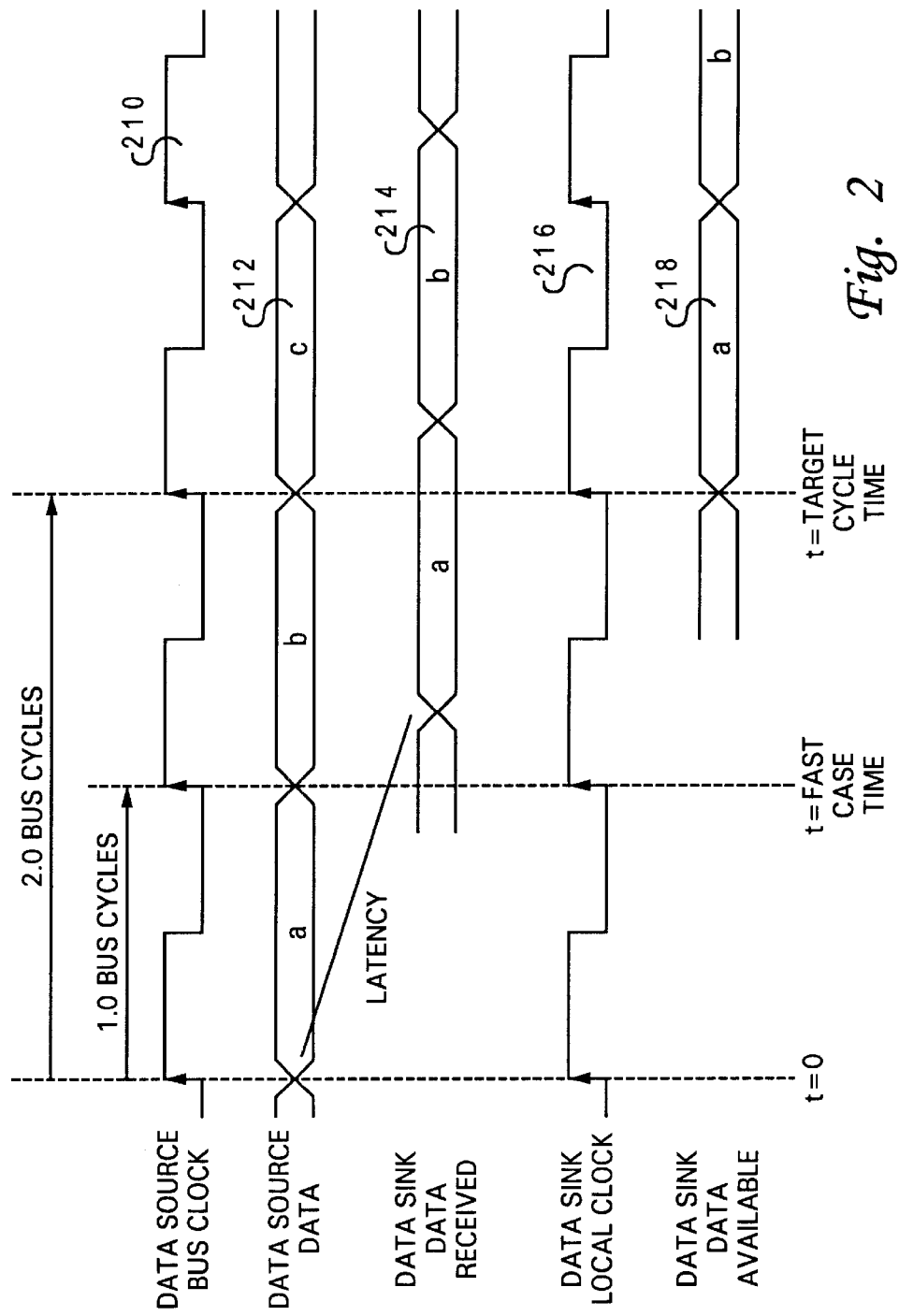
FIG. 2 illustrates a timing diagram of a wave-pipelined method of transferring data.

Referring now to FIG. 2, there is illustrated a timing diagram for a wave-pipelined interface. In general, the timing analysis is more complicated in a wave-pipelined interface since both the fast path and slow path are equally critical. In the timing diagram illustrated, the fast path case time is greater than 1 bus clock signal and the slow path case is less than the target cycle time which is 2 bus cycles in this case. The first data (a) is transmitted during the first cycle and received during a second cycle whereby first data (a) is accessible at the data sink for use or storage at a third cycle. The second data (b) is transmitted during the second cycle and received during the third cycle whereby second data (b) is accessible at the data sink for use or storage at a fourth cycle. A data source bus clock is illustrated at reference numeral 210 where a first complete cycle of the data source bus clock is between time=0 and time=fast path case time and where the first data (a) is expected to be deterministically available at the bus cycle after the target cycle time. The data source data is depicted at reference numeral 212 wherein first data (a) is the data transmitted to the data sink during the first bus cycle. The first data (a) received at the data sink is illustrated at reference numeral 214 arriving within the next bus cycle after the bus cycle that the data is transmitted, at a period of time after being transmitted. The period of time between when the data is transmitted at reference numeral 212 and received at reference numeral 214 is the latency across the interface. A data source local clock, which is at the same frequency and phase as the data source bus clock, is depicted at reference numeral 216. At the rising edge of the data sink local clock at time=target cycle time, the first data (a) received at the data sink becomes accessible to the data sink as illustrated at reference numeral 218. Thereby, if a new data element is transmitted, the data will be received during the next bus cycle after the bus cycle that the data is transmitted. Following, the data will be accessible at the next bus cycle after the bus cycle that the data is received for use or storage at the data sink.

As depicted, it is typical in the wave-pipelined interface that the bus cycle time can be reduced to the time between the fast path case and slow path case. However, if the fast case of the present timing diagram was reduced to less than the first bus cycle, the bus cycle time would be slowed in order that the data would still arrive during the second cycle if transmitted at the first cycle. In general, in order to maintain cycle synchronization for a wave-pipelined interface, if the data timing variations exceed or cross over a cycle boundary, the functional unit designer must slow the speed of the interface to the point in which the cycle data arrives is no longer ambiguous. The data must arrive at the data sink during a specified cycle in order to be processed correctly. Therefore, the speed of a wave-pipelined interface is limited to the extent that the interface cannot maintain cycle synchronization while allowing the data to arrive at the data sink over a range of bus cycles.

Figure 3:
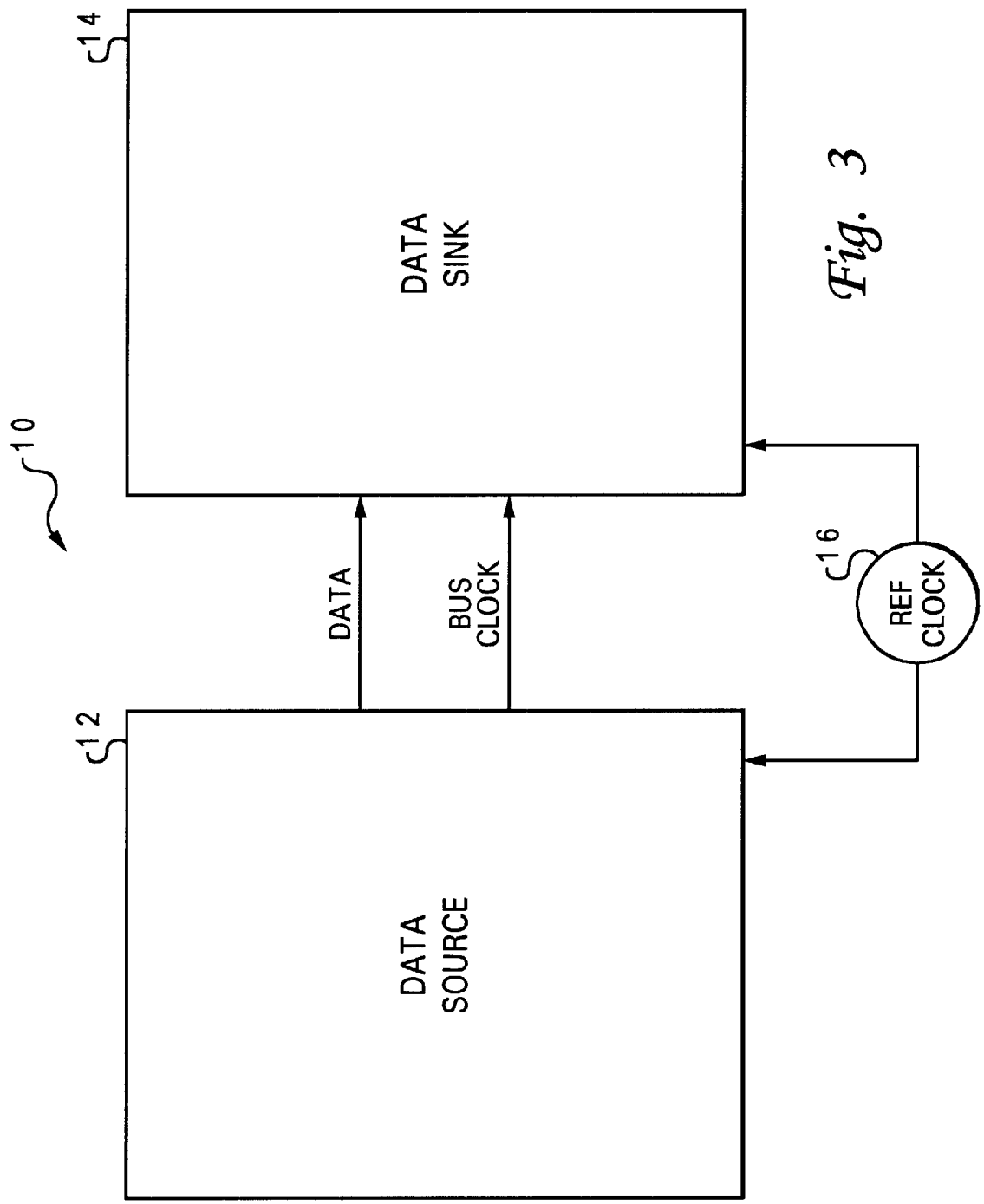
FIG. 3 is a high level block diagram depicting a data transfer system including a data source and data sink which may be utilized to implement the method and system of the present invention.

Referring now to FIG. 3, there is depicted a high level block diagram illustrating a data transfer system 10 which may be utilized to implement the method and system of the present invention. Data transfer system 10 is well suited for a wave-pipelined interface. As illustrated, data transfer system 10 may be constructed utilizing a data source 12 and a data sink 14. Data and a bus cycle signal are transmitted from the data source 12 and received at the data sink 14. A reference clock 16 is also depicted which is connected to both the data source 12 and the data sink 14. The reference clock 16 ensures clock frequency synchronization between data source 12 and data sink 14 as will be described in greater detail herein.

Figure 4:
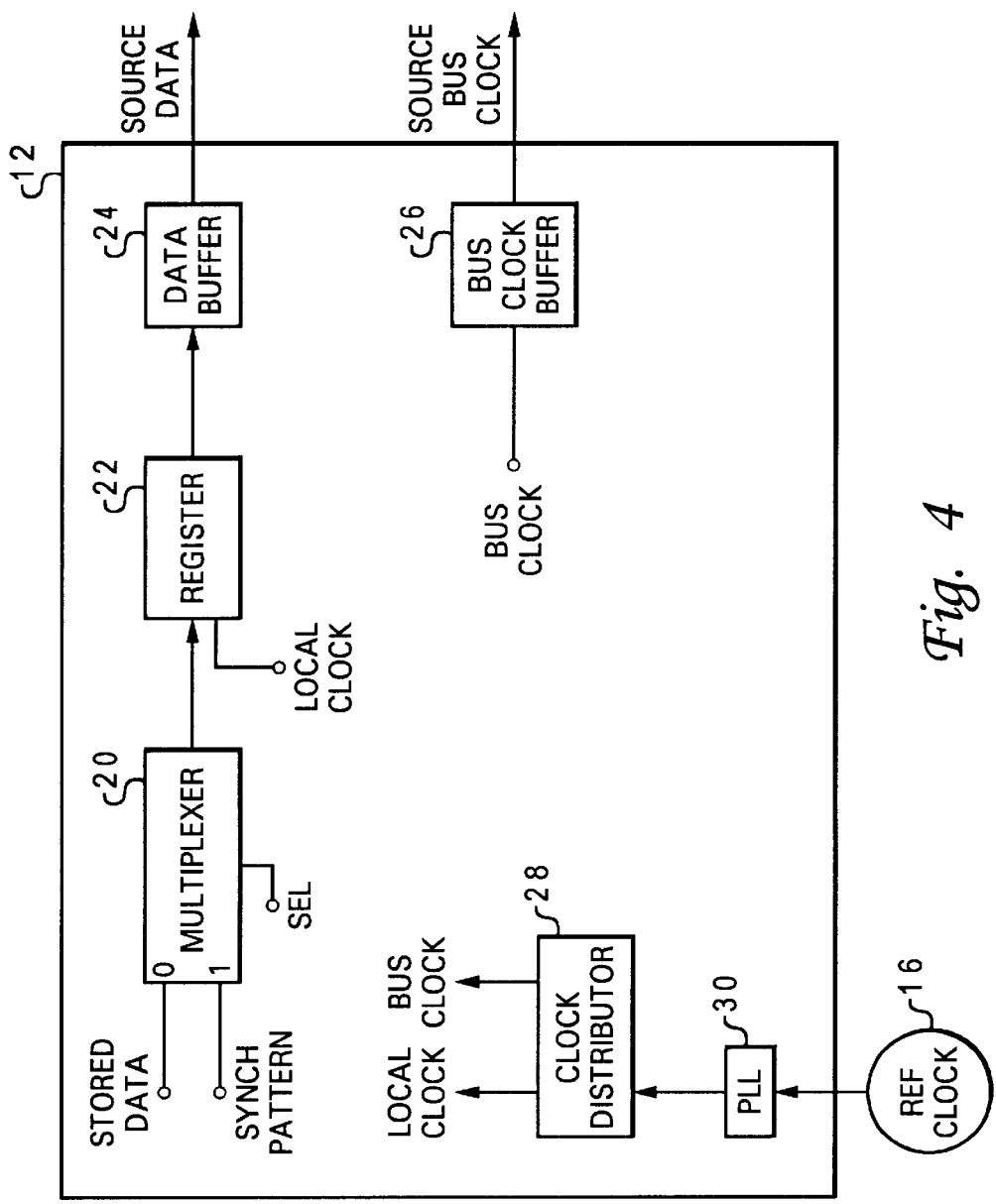
FIG. 4 is a high level block diagram illustrating a data source which may be utilized in conjunction with the data sink to provide the data transfer system of FIG. 3.

Referring now to FIG. 4, there is depicted a high level block diagram of a data source 12 which may be utilized in conjunction with the data sink 14 to provide the data transfer system 10 of FIG. 3. As illustrated, data source 12 preferably includes a multiplexer 20, a register 22, a data buffer 24, a bus clock buffer 26, a clock distributor 28 and a phase lock loop (PLL) 30 connected to reference clock 16.

Multiplexer 20 provides a selection means necessary to choose between a stored data input and a synchronous data pattern input. The input selected will provide the source data for transmittal by the data source 12 at the proper time. The multiplexer 20 is set to synchronous mode (SEL=1) when the data transfer system 10 is powered up or reset. Otherwise the multiplexer 20 is set to normal data transfer mode (SEL=0). The synchronous data pattern is a series of bits with the property of being unique every X bits and is utilized in testing the synchronization of the data sink 14 to properly determine the phase of the received data, as will be described with the synchronous mode in greater detail herein.

Register 22, which in a preferred embodiment of the present invention is a flip-flop, provides a temporary storage position for the data output from the multiplexer 20. The data temporarily stored in the register 22 is directed to the data buffer 24 for transmittal as source data to the data sink 14. A local clock signal controls when the data output from the multiplexer 20 is loaded into the register 22 and thereby placed in the data buffer for transmittal as source data to the data sink 14. In the present embodiment, the register is loaded on the rising edge of the local clock signal which will be described in greater detail herein.

Figure 5:
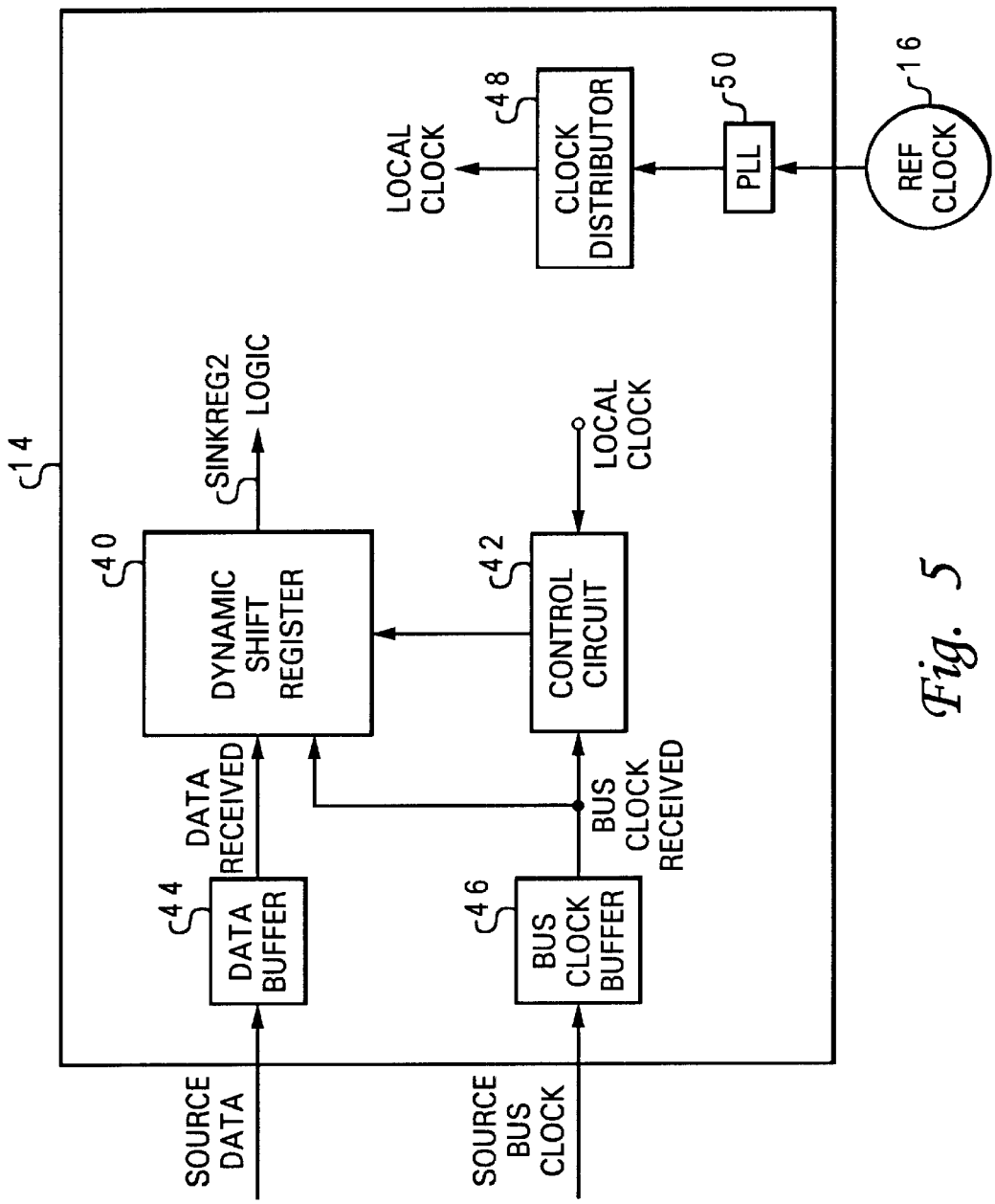
FIG. 5 is a high level block diagram depicting a data sink which may be utilized In conjunction with the data source to provide the data transfer system of FIG. 3.

With reference now to FIG. 5, there is depicted a high level block diagram of a data sink 14 which may be utilized in conjunction with the data source 12 to provide the data transfer system 10 of FIG. 3. Data sink 14 preferably includes a dynamic shift register 40, a control circuit 42, a data buffer 44, a bus clock buffer 46, a clock distributor 48 and a PLL 50 connected to the reference clock 16.

Dynamic shift register 40 comprises N segments through which the data may pass before becoming accessible to the data sink 14. Any data which passes through the dynamic shift register 40 is first received as source data at the data buffer 44 and then passed to the shift register 40. Additionally, a source bus clock signal is received by the bus clock buffer 46 and passed to the dynamic shift register 40. The data sink local clock 48 provides a local clock signal, which is utilized along with the bus clock signal to control the rate at which received data passes through the N segments of the dynamic shift register 40. Additionally, the control circuit utilizes the bus clock signal and local clock signal to provide a control signal to the dynamic shift register for selecting an M segment subset of the N segment shift register through which the data passes. By selecting the M segment subset of the N segment dynamic shift register, the control circuit 42 regulates a controllable predetermined time at which the data is accessible from the dynamic shift register 40 to the data sink 14.

Referring now to FIGS. 4 and 5, by connecting the phase lock loop (PLL) input to the reference clock 16, any clocks connected to the PLL are inherently synchronous as is well known in the art. Thereby, the PLL 30 of the data source 12 and the PLL 50 of the data sink 14 are both locked to the reference clock 16. The reference clock 16 typically outputs a low frequency clock signal and determines a t=0 starting point. The PLL 30 of the data source 12 supplies the low frequency clock signal from the reference clock 16 to the clock distributor 28. In the data sink 14, the PLL 50 supplies the low frequency signal to the clock distributor 48. Each clock distributor supplies a plurality of clock signals for the data source 12 and data sink 14 to function. In the present embodiment, the clock distributors each supply a local clock signal which is P times faster in frequency than the reference clock signal and close in phase. In addition, in the present embodiment, the clock distributor 28 of the data source 12 supplies a bus clock signal which is P times faster in frequency than the reference clock and may be phase delayed by half a clock cycle in comparison with the local clock signal of data source 12. The source bus clock signal is transmitted through a bus clock buffer 26 of the data source 12 and is received at the bus clock buffer 46 of the data sink 14.

Figure 6:
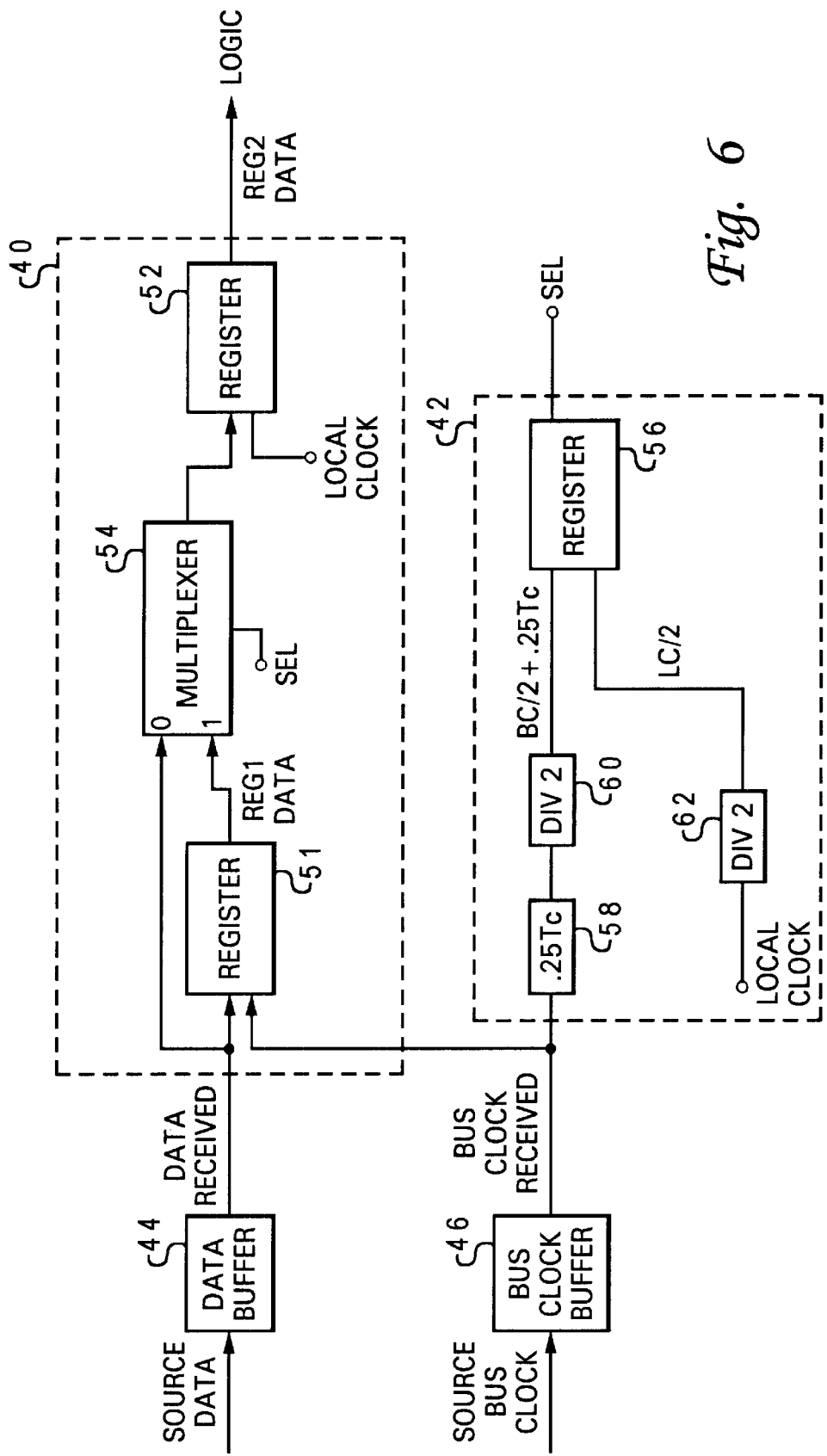
FIG. 6 is a more detailed block diagram illustrating a dynamic shift register and control circuit which may be utilized within the data sink of FIG. 5.

With reference now to FIG. 6, there is depicted a more detailed block diagram illustrating a dynamic shift register 40 and a control circuit 42. In the dynamic shift register 40, an N segment dynamic shift register 40 is depicted where N=2. As illustrated, a first register 51 may be utilized as the first segment and a second register 52 may be utilized as the second segment. The first register 51 is loaded at the rising edge of the received bus clock. The second register 52 is loaded at the rising edge of the local clock signal. Also depicted is a multiplexer 54 which may be utilized to select the M segment subset of the N segment shift register.

In the control circuit 42, a more detailed block diagram is depicted which determines the phase of an adjusted local clock signal during which the bus clock signal is received at the control circuit 42 from the bus clock buffer 46. The phase is utilized in order to determine the M segment subset through which the data will pass. As illustrated, in determining the phase, the bus clock signal (BC) is lengthened by a dividing component 60 which divides the BC signal by two and a shifting component 58 which delays the BC signal by 0.25*Target cycle time (Tc). Also depicted is the local clock signal (LC), which is lengthened by a dividing component 62 that divides the LC signal by two. A register 56 is depicted which receives the BC/2+0.25Tc signal as a data input and the LC/2 signal as a clock input. In the present invention, at the rising edge of the LC/2 signal input, the BC/2+0.25Tc signal at the register 56 is loaded into the register 56. The output of the register 56 is a SEL signal which is either high or low dependent upon the BC/2+0.25Tc signal loaded. As those skilled in the art will appreciate, the amounts by which the bus clock and local clock signals are lengthened and shifted may vary depending on manufacturing constrains and interface latency.

In the dynamic shift register 40, if SEL=1, then the REG1 data from the first register 51 is passed through the multiplexer 54 to the second register 52. Otherwise, if SEL=0, then the data received from data buffer 44 is passed through the multiplexer 54 to the second register. The second register 52 loads the data from the multiplexer 54 at the rising edge of the local clock signal and outputs the data as REG2 data which is accessible to the data sink 14. In the present embodiment, when the data is accessible at the second register 52, the REG2 data is sent to the logic of the data sink 14. As those skilled in the art will appreciate, data which is accessible at a data sink may be utilized in a plurality of ways in addition to controlling the logic of the data sink.

In testing the synchronization of the transfer of data from the data source 12 to the data sink 14 once the parts are manufactured, the synchronization mode might be utilized. At power up or reset, the data source 12 operates in synchronization mode whereby the synchronization pattern of the data source 10 is selected for output to the data sink 14. In the case where X=2, the synchronization pattern may be 10101010. The pattern is repeated over a plurality of times to ensure proper testing. The synchronization of the data sink 14 is established by sampling the incoming data on every other cycle and choosing the phase of the bus clock divided by two signal which is in phase with the 1 in the data stream. This testing ensures the "bus reference cycle" is properly synchronized with the incoming data.

Figure 7:
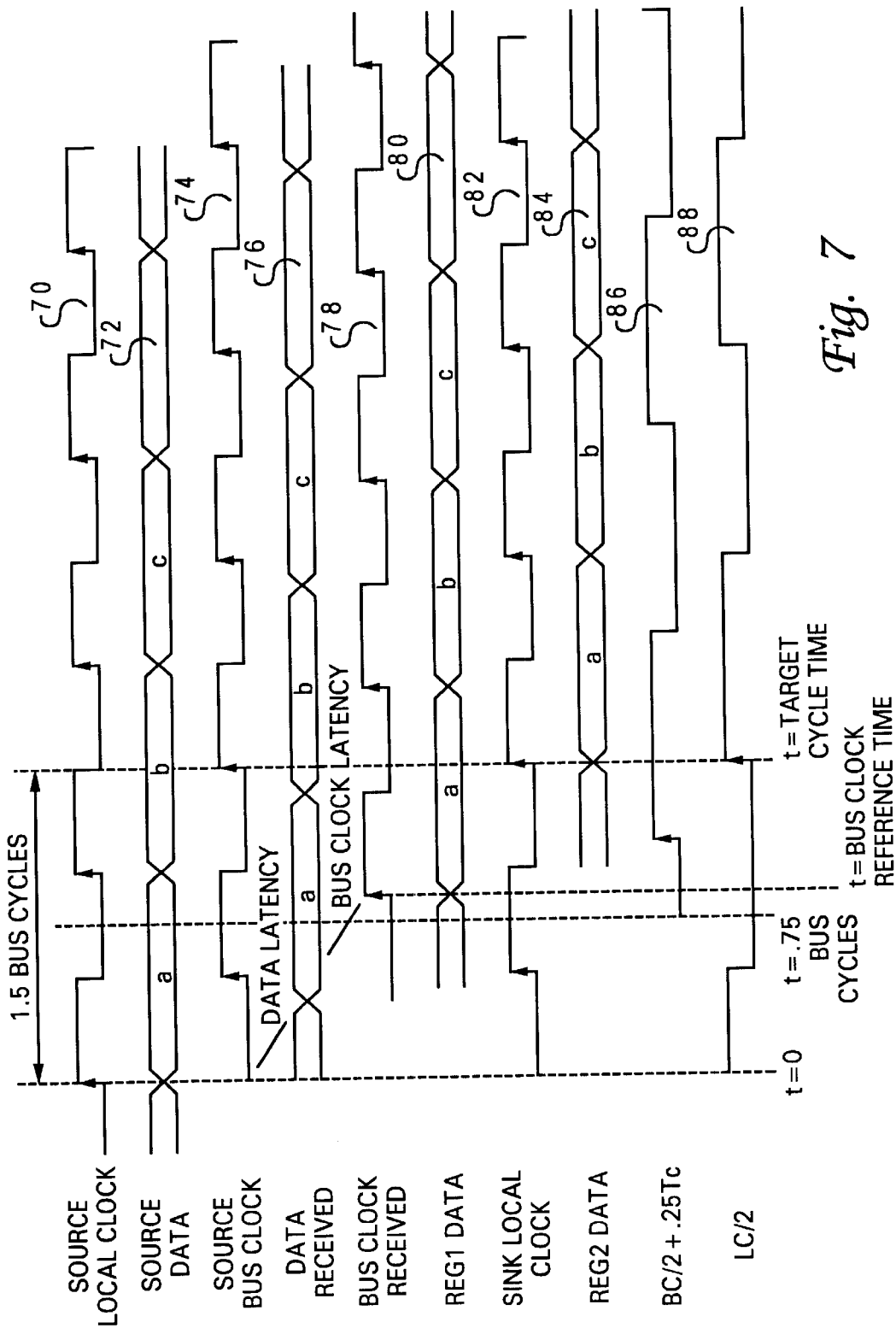
FIG. 7 depicts a timing diagram of the dynamic shift register operation of FIG. 6 where data is received in a first phase.
Figure 9:
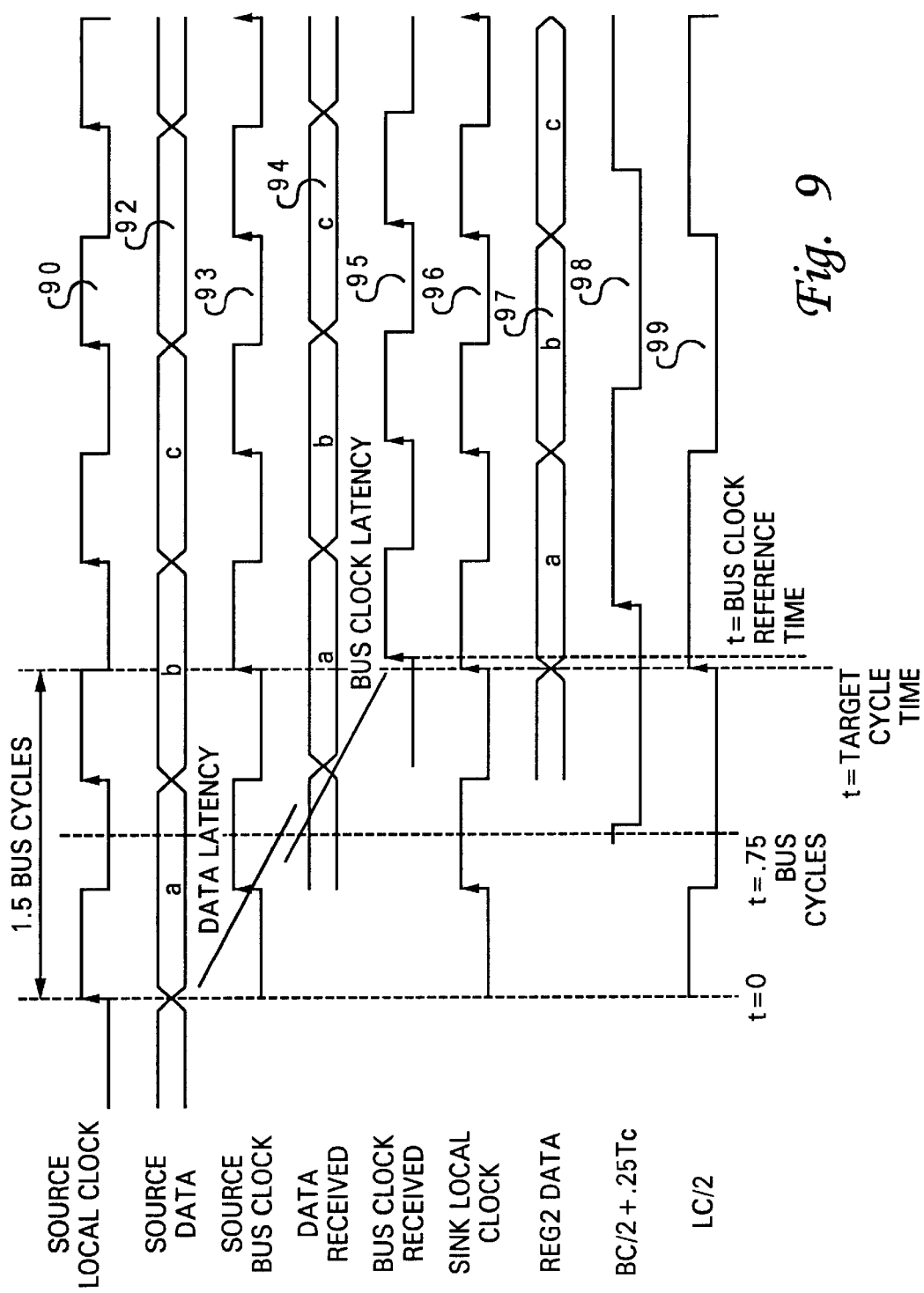
FIG. 9 depicts a timing diagram of the dynamic shift register operation of FIG. 6 where data is received in a second phase.

Referring now to FIGS. 7 and 9, there is depicted a timing diagram showing an example of timing between the data source 12 and data sink 14 with particular reference to the N segment dynamic shift register 40 of FIG. 6 where N=2. In the timing diagram illustrated, the target cycle time before which each data element, in a string of data (abc), may be received is 1.5 bus cycles. More specifically, in the present example, N phases of the bus cycle time during which each data element may be received before time=target cycle time have been distinguished where N=2. The first phase of time is from 0 to 0.75 bus cycles and the second phase of time is from 0.75 to 1.5 bus cycles. By splitting the latency range into two phases, the data can be received over a range of bus cycles. Thereby, cycle synchronization in the N segment dynamic shift register is not constrained by bus cycle boundaries. The N segment dynamic shift register compensates for any cycle boundary crossover within the range of bus cycles utilized. Additionally, the N segment dynamic shift register controls the data such that the data is accessible at the bus cycle after the target cycle time for each 1.5 bus cycles.

Still referring to FIGS. 7 and 9, the phase during which the first data (a) of the string of data (abc) arrives determines the phase of the 1.5 bus cycles during which the other data following consecutively in the string of data (abc) will arrive. The 1.5 bus cycles for each data element transmitted begins when the data is available at the data source to send to the data sink as will be illustrated in the timing diagrams. Therefore, the results of first data (a) arriving during the first phase are illustrated by FIG. 7. The timing results of receiving first data (a) during the second phase will be further described in FIG. 9.

With reference now to FIG. 7, timing for the data source local clock signal is illustrated at reference numeral 70 where the rising edge of the source local clock signal is at time=0. First data (a) is thereby loaded into the register 22 of data source 12 at the rising edge of the local clock signal (time=0) as depicted in the timing for source data at reference numeral 72. The source bus clock signal of data source 12 is synchronized to the same starting point (time=0) as the source local clock and is at the same frequency. The timing of the sink local clock signal is illustrated at reference numeral 82 synchronized in frequency and starting point (time=0) with the source local clock signal and source bus clock signal as controlled by the reference clock 16. The first data (a) is received at the data buffer 44 of the data sink 14 after a data latency delay as depicted at reference numeral 76. In the present timing diagram, the data latency is less than 0.75 bus cycles. Following, the bus clock received signal arrives at the data sink 14 at time=bus clock reference time after a bus clock latency delay which is less than 1.5 bus cycles as illustrated at reference numeral 78. At the rising edge of the bus clock received signal, the register 51 of the dynamic shift register 40 loads the first data (a) at the data buffer 44 as depicted at reference numeral 80. The timing of the BC/2+0.25Tc signal is illustrated at reference numeral 86 where the BC/2+0.25Tc is high at the rising edge of the LC/2 signal, setting SEL=1. Since SEL=1, the first data (a) REG1 data from the first register 51 is passed by the multiplexer 54 and loaded into the second register 52 at the rising edge of the sink local clock as depicted at reference numeral 84. As those skilled in the art would appreciate, the multiplexer 54 and timing signals BC/2+0.25Tc and LC/2 may be configured such that a SEL=0 setting would pass the REG1 data from the first register 51 and load into the second register 52.

Figure 8:
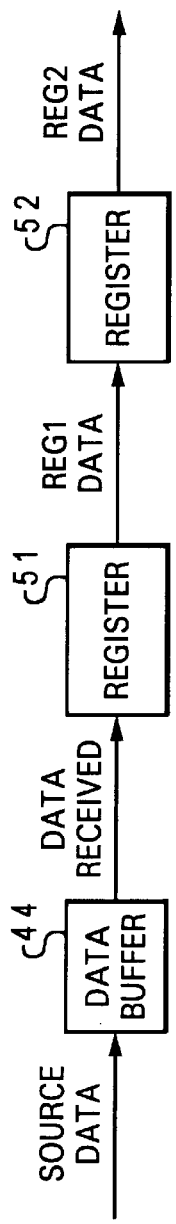
FIG. 8 is a more detailed block diagram illustrating the M segment subset of the dynamic shift register of FIG. 6 utilized in FIG. 7.

Referring now to FIG. 8, there is depicted a more detailed block diagram of the two segment subset of the two segment dynamic shift register 40 which is utilized under the conditions detailed in FIG. 7. Since the first data (a) is received in the first phase, the data must be held for the remainder of the 1.5 bus cycles in the first register 51 before being loaded into the second register 52. By holding the first data (a) in the first register 51, the second data (b) can be received at the data buffer 44 before the 1.5 data cycles are completed. Also important, by holding the first data (a) in the first register 51 until the target cycle time, the first data (a) is not loaded into the second register 52 and made accessible to the data sink 14 until a controllable predetermined time. The controllable predetermined time in the present illustration is at the bus cycle after the target cycle time. As those skilled in the art would appreciate, the controllable predetermined time may be shifted to a plurality of bus cycles after the target cycle time.

With reference now to FIG. 9, there is illustrated a continuation of the timing diagram of the dynamic shift register operation of FIG. 6. More specifically, in the present diagram, the timing results of data received in the second phase from 0.75 bus cycles to 1.5 bus cycles are depicted. Timing for the source local clock signal, source bus clock signal and sink local clock signal as illustrated at reference signals 90, 93, and 96 consecutively, do not change from FIG. 7 to FIG. 9 because the clocks are synchronized to a common frequency and starting point (time=0) from the reference clock 16. The data latency time however is increased whereby the first data (a) arrives between 0.75 bus cycles and 1.5 cycles as depicted at reference numeral 94. The bus clock received signal arrives at the bus cycle buffer 46 after the target cycle time has expired as illustrated at reference numeral 95. The BC/2+0.25Tc signal is low at the rising edge of the LC/2 signal whereby SEL=0, as depicted at reference numerals 98 and 99. Since the phase selector signal remains low (SEL=0), the first data (a) passes from the data buffer 44 and is loaded into the second register 52 at the rising edge of the sink local clock signal as illustrated at reference numeral 97.

Figure 10:
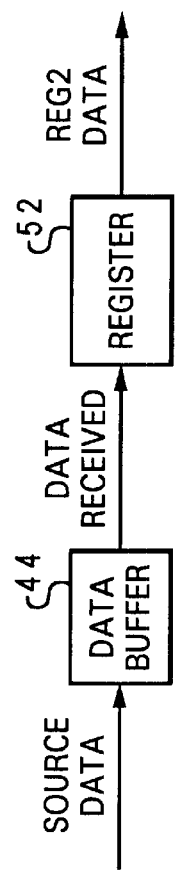
FIG. 10 is a more detailed block diagram illustrating the M segment subset of the dynamic shift register of FIG. 6 utilized in FIG. 9.

Referring now to FIG. 10, there is depicted a more detailed block diagram of the one segment subset of the two segment dynamic shift register 40 which is utilized under the conditions described in FIG. 9. Since the first data (a) is received in the second phase, the data in the data sink 14 is passed directly from the data buffer 44 to the second register 52. By passing the first data (a) in the data buffer 44 to the second register 52, the first data (a) can be loaded into the second register 52 at the target cycle time even though the bus clock signal has not arrived. By only using a 1 segment subset of the 2 segment shift register 40, the first data (a) is loaded into the second register 52 and made accessible to the data sink 14 at the controllable predetermined time at the bus cycle after the target cycle time. Both second data (b) and third data (c) utilize the 1 segment subset of the 2 segment shift register such that the second data (b) and third data (c) are each loaded into the second register 52 and made accessible to the data sink 14 at controllable predetermined times.

Figure 11:
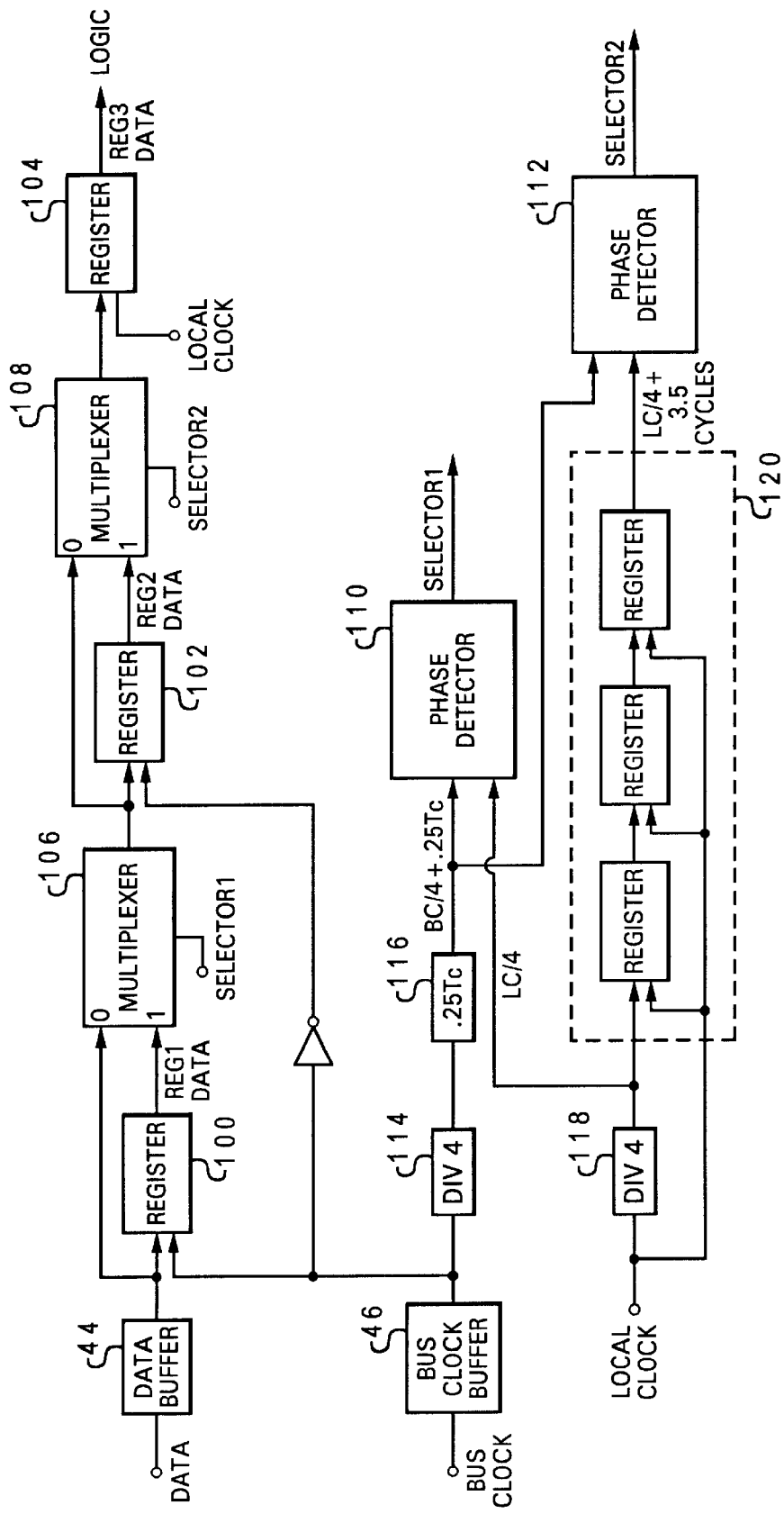
FIG. 11 is a more detailed block diagram depicting a dynamic shift register and control circuit which may be utilized within the data sink of FIG. 5.

With reference now to FIG. 11, there is depicted a more detailed block diagram illustrating a dynamic shift register 40 and a control circuit 42. In the dynamic shift register 40, an N segment dynamic shift register 40 is depicted where N=3. As illustrated, a first register 100 may be utilized as the first segment, a second register 102 may be utilized as the second segment, and a third register 104 may be utilized as the third segment. Also depicted is a first multiplexer 106 and a second multiplexer 108, which may be utilized to select a path for the data to pass along. The register 100 is loaded on the rising edge of the bus clock signal. Half a bus cycle later, the second register 102 is loaded on the falling edge of the bus clock signal. Finally, the third register 104 is loaded on the rising edge of the local clock signal.

In the control circuit 42, a more detailed block diagram is depicted which determines the phase of the adjusted local clock signal during which the bus clock received signal is arrives at the control circuit 42 from the bus clock buffer 46. As illustrated, in determining the phase, the bus clock received signal (BC) is lengthened by a dividing component 114 that divides the BC signal by four. In addition, the BC/4 signal is delayed by a shifting component 116 which shifts the phase of the BC/4 signal by 0.25Tc to provide a BC/4+0.25Tc signal. Also depicted is the sink local clock signal (LC) which is lengthened by a dividing component 118 which divides the LC signal by four to provide a LC/4 signal. Additionally, illustrated is the LC/4 signal which is delayed by shifting component 120 which shifts the phase of the LC/4 by 3.5 cycles of the local clock to provide an LC/4+3.5 cycles signal. As those skilled in the art will appreciate, the amounts by which the bus clock and local clock signals are lengthened and shifted may vary depending on manufacturing constrains and interface latency.

A phase detector 110 is depicted which receives the BC/4+0.25Tc signal as a data input and the LC/4 signal as a clock input. A selector1 signal is output from the phase detector 110 to the selection input of the multiplexer 106. When selector1=1, the data from the register 100 is selected by the multiplexer 106. Otherwise, when selector1=0, the data from the data buffer 44 is selected by the multiplexer 106.

A phase detector 112 is also illustrated in control circuit 42. Phase detector 112 receives the BC/4+0.25Tc signal as a data input and LC/4+3.5 cycles signal as a clock input. A selector2 signal is output from the phase detector 112 to the selection input of the multiplexer 108. When selector2=1, the data from the register 102 is selected by multiplexer 108. Otherwise when selector2=0, the data from the multiplexer 106 is selected by the multiplexer 108.

Figure 12:
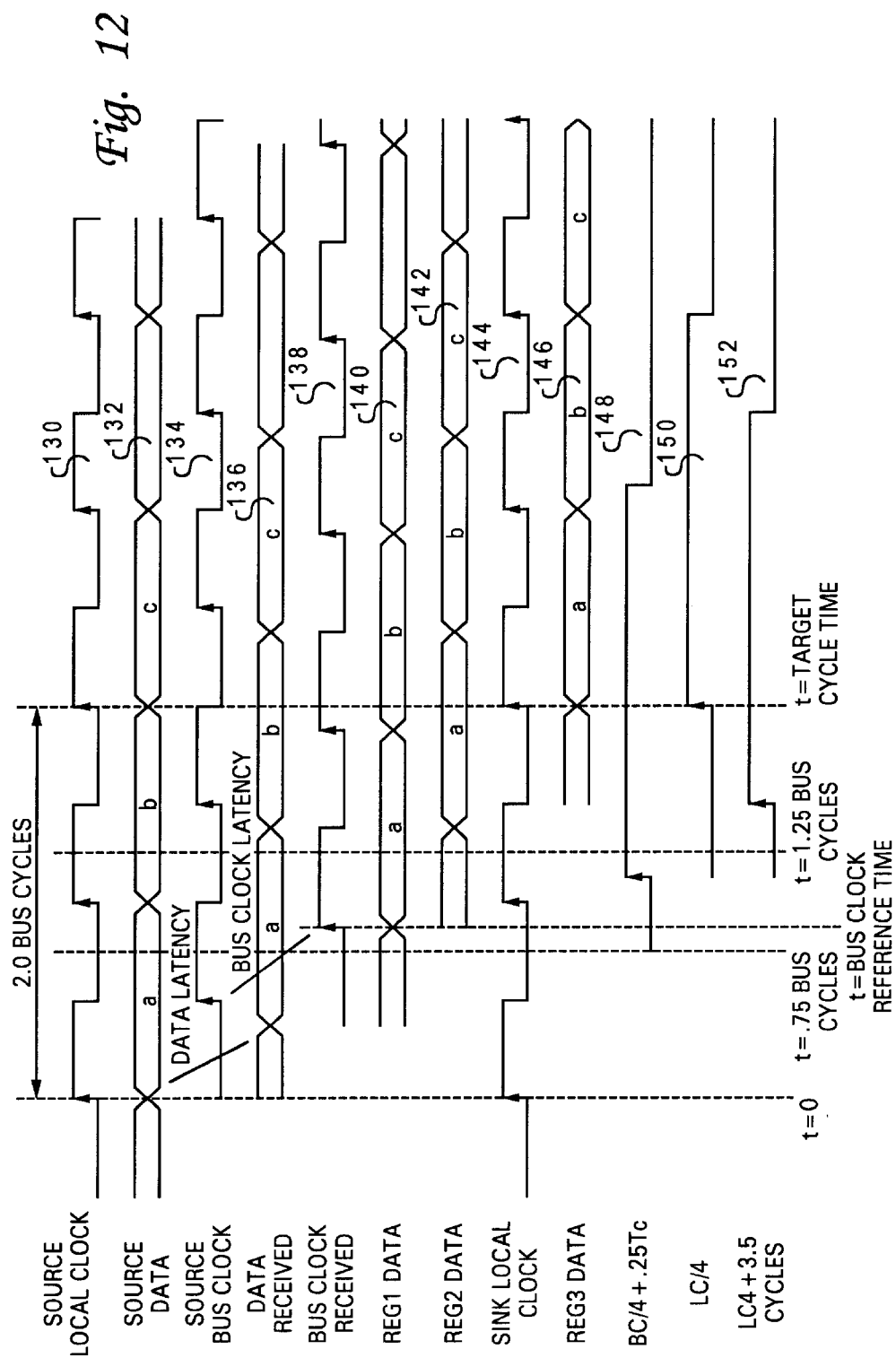
FIG. 12 illustrates a timing diagram of the dynamic shift register operation of FIG. 11 where data is received in a first phase.
Figure 14:
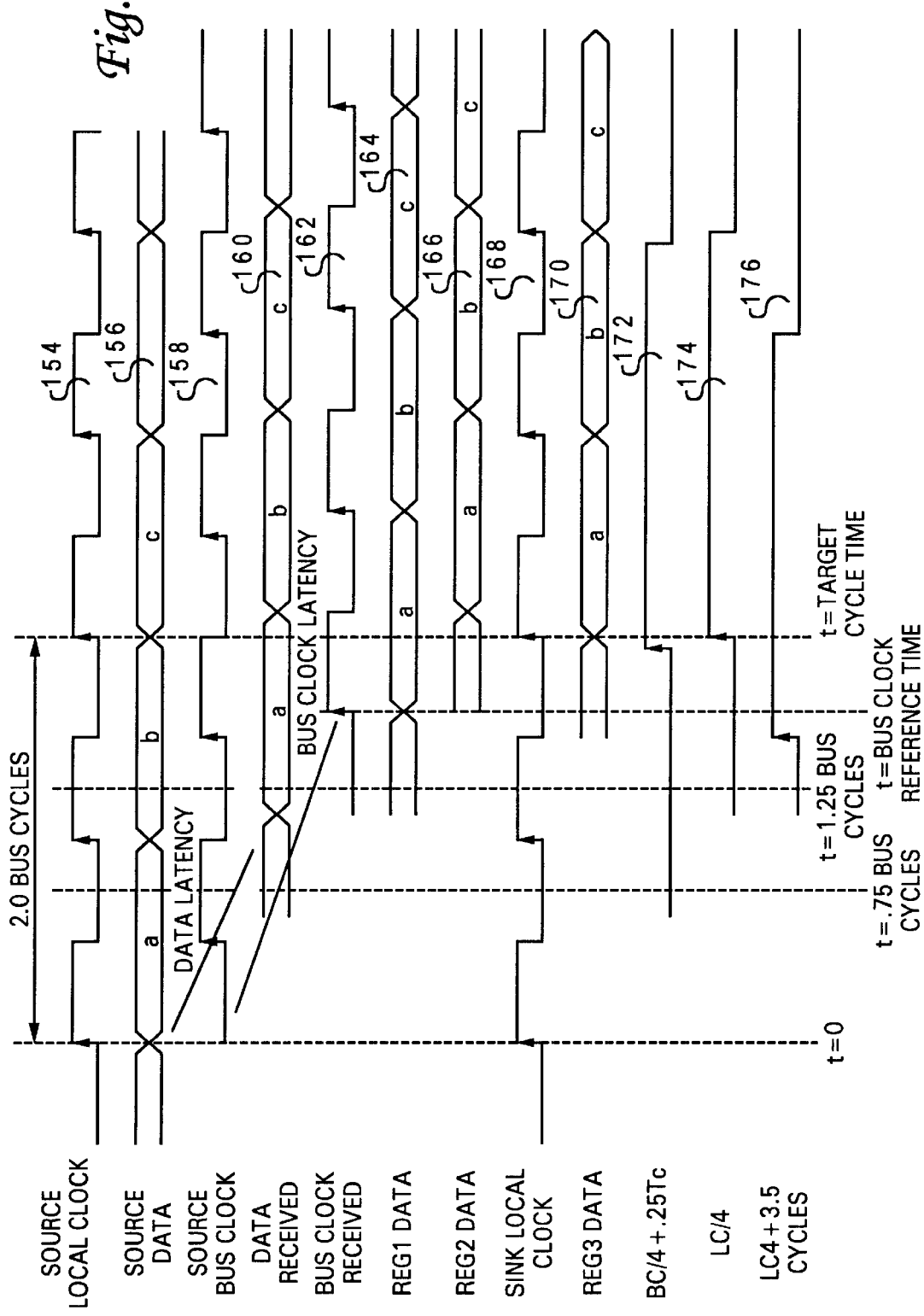
FIG. 14 illustrates a timing diagram of the dynamic shift register operation of FIG. 11 where data is received in a second phase.

Referring now to FIGS. 12, 14 and 16, there is depicted a timing diagram showing an example of timing between elements of the invention for the N segment dynamic shift register where N=3. In the timing diagram illustrated, the time=target cycle time during which each data element in a data string (abc) may be received is variable between 2 bus cycles. More specifically, in the present example, three phases of bus cycle time during which the data may be received before the target cycle time have been distinguished. The first phase of time is from 0 to 0.75 bus cycles, the second phase of time is from 0.75 to 1.25 bus cycles, and the third phase of time is from 1.25 to 2.00 bus cycles. The timing results of first data (a) of the data string (abc) arriving during the first phase are illustrated by FIG. 12. The timing results of receiving first data (a) during the second phase will be further depicted in FIG. 14. Additionally, the timing results of receiving first data (a) during the third phase will be further illustrated in FIG. 16.

With reference now to FIG. 12, timing for the source local clock signal is illustrated at reference numeral 130 where the rising edge of the source local clock signal is at time=0. First data (a) is thereby loaded into the register 22 of data source 12 at the rising edge of the clock (time=0) as depicted in the timing for source data at reference numeral 132. The source bus clock signal is synchronized to the same starting point (time=0) as the source local clock and is at the same frequency as illustrated at reference numeral 134. Timing of the sink local clock signal is depicted at reference numeral 144 synchronized in frequency and starting point (time=0) with the source local clock signal and source bus clock signal as controlled by the reference clock 16.

Still referring now to FIG. 12, the first data (a) is received at the data buffer 44 of the data sink 14 after a data latency delay as illustrated at reference numeral 136. In the present timing diagram, the data latency is less than 0.75 bus cycles. The bus clock received signal arrives at the data sink 14 after a bus clock latency delay which is less than 1.25 bus cycles as depicted at reference numeral 138. At the rising edge of the bus clock received signal, the register 100 of the dynamic shift register 40 loads the first data (a) REG1 data from the data received at data buffer 44 as illustrated at reference numeral 140. The timing of the BC/4+0.25Tc signal is depicted at reference numeral 148 where the BC/4+0.25Tc is high before the end of the second phase. Since the BC/4+0.25Tc is high at the rising edge of the LC/4+3.5 cycles signal as illustrated at reference numeral 152, selector1=1. With selector1=1, the REG1 data from first register 100 is passed by the multiplexer 106 and loaded into the second register 102 as REG2 data at the falling edge of the received bus clock as illustrated at reference numeral 142. Following, since the BC/4+0.25Tc is high at the rising edge of the LC/4 signal as depicted at reference numeral 150, selector2=1. With selector2=1, the REG2 data from the second register 102 is passed by the multiplexer 108 and loaded into the third register as REG3 data at the rising edge of the local clock as illustrated at reference numeral 146.

Figure 13:
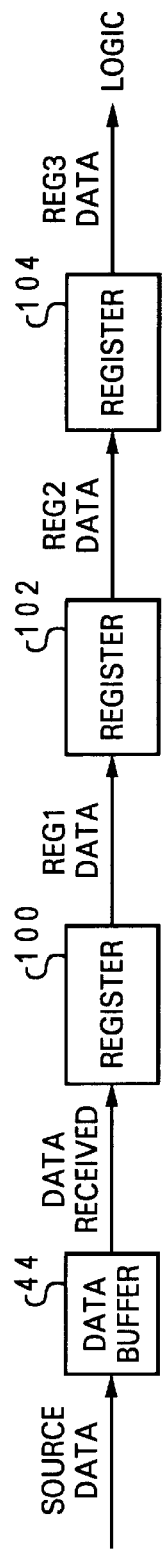
FIG. 13 is a more detailed block diagram depicting the M segment subset of the dynamic shift register of FIG. 11 utilized in FIG. 12.

Referring now to FIG. 13, there is depicted a more detailed block diagram of the three segment subset of the three segment dynamic shift register 40 which is utilized under the conditions detailed in FIG. 12. Since the first data (a) is received in the first phase, the data must be passed from the first register to the second register 102 before being loaded into the third register 104. By holding the first data (a) in the second register 102, the second data (b) of the data string (abc) can be loaded into the first register 100 before the 2.0 bus cycles are completed. Also important, by holding the first data (a) in the second register 102 until the target cycle time. The first data (a) is thereby not loaded into the third register 104 and made accessible to the data sink 14 until a controllable predetermined time where the predetermined time is at the bus cycle after the target cycle time. The second data (b) is also held in the second register until the end of the target cycle which starts one cycle after that of first data (a). The second data (b) is thereby made accessible to the data sink 14 at a controllable predetermined time where the predetermined time is at bus cycle after the target cycle time.

With reference now to FIG. 14, timing for the source local clock signal is illustrated at reference numeral 154 where the rising edge of the source local clock signal is at time=0. Timing for the source local clock signal, source bus clock signal and sink local clock signal as depicted at reference numerals 154, 158 and 168 consecutively, do not change from FIG. 12 to FIG. 14 because the clocks share a common frequency and starting point (t=0) from the reference clock 16.

Still referring now to FIG. 14, first data (a) is loaded into the register 22 of data source 12 at the rising edge of the source local clock (t=0) as illustrated in the timing for source data at reference numeral 156. The first data (a) is received at the data buffer 44 of the data sink 14 after a data latency delay as depicted at reference numeral 160. In the present timing diagram, the data latency is less than 1.25 bus cycles. The bus clock received signal arrives at the data sink 14 after a bus clock latency delay which is less than 2.00 bus cycles as illustrated at reference numeral 138. At the rising edge of the bus clock received signal, the register 100 of the dynamic shift register 40 loads the first data (a) REG1 data from the data received at data buffer 44 as depicted at reference numeral 140.

With reference still to FIG. 14, the timing of the BC/4+0.25Tc signal is illustrated at reference numeral 148 where the BC/4+0.25Tc is greater than the end of the second phase. Since the BC/4+0.25Tc is high at the rising edge of the LC/4 signal as depicted at reference numeral 152, selector1=1. With selector1=1, the REG1 data from first register 100 is passed by the multiplexer 106 and loaded into the second register 102 as REG2 data at the falling edge of the received bus clock as illustrated at reference numeral 142. Following, since the BC/4+0.25Tc is low at the rising edge of the LC/4+3.5 cycles signal as depicted at 1 reference numeral 50, selector2=0. With selector2=0, the REG1 data from the multiplexer 106 is passed by the multiplexer 108 and loaded into the third register 106 as REG3 data at the rising edge of the local clock as illustrated at reference numeral 146. The second register 102 receives the REG1 data from the first register at the falling edge of the bus clock received signal. Thereby, while the received data does load into the second register 102, the REG2 data is not selected by the multiplexer 108 to pass to the third register 106.

Figure 15:
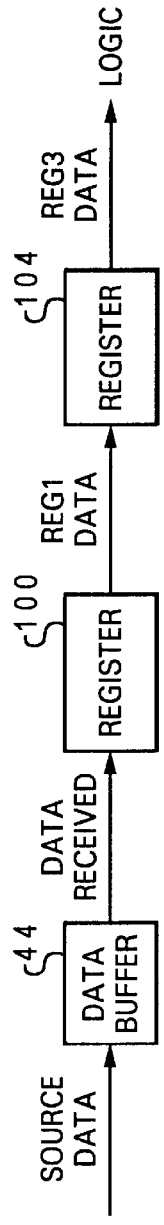
FIG. 15 is a more detailed block diagram depicting the M segment subset of the dynamic shift register of FIG. 11 utilized in FIG. 14.

Referring now to FIG. 15, there is depicted a more detailed block diagram of the two segment subset of the three segment dynamic shift register 40 which is utilized under the conditions detailed in FIG. 14. Since the first data (a) is received in the second phase, the data must be held in the first register 100 before being passed to the third register 104. By bypassing the second register 102 and holding the first data (a) in the first register 100 until the target cycle time, the data is not loaded into the third register 104 and made accessible to the data sink 14 until a controllable predetermined time.

With reference now to FIG. 16, timing for the source local clock signal is illustrated at reference numeral 178 where the rising edge of the source local clock signal is at time=0. Timing for the source local clock signal, source bus clock signal and sink local clock signal as depicted at reference numerals 178, 182 and 192 consecutively, do not change from FIG. 12 to FIG. 14 because the clocks are synchronized to a common frequency and starting point (time=0) from the reference clock 16. First data (a) is thereby loaded into the register 22 of data source 12 at the rising edge of the source local clock (time=0) as illustrated in the timing for source data at reference numeral 180. The first data (a) is received at the data buffer 44 of the data sink 14 after a data latency delay as depicted at reference numeral 184. In the present timing diagram, the data latency is less than 2.00 bus cycles.

The bus clock received signal arrives at the data sink 14 after a bus clock latency delay which is greater than 2.00 bus cycles as illustrated at reference numeral 138. The timing of the BC/4+0.25Tc signal is depicted at reference numeral 148 where the BC/4+0.25Tc is low before the target cycle time. Since the BC/4+0.25Tc is low at the rising edge of the LC/4 signal as illustrated at reference numeral 152, selector1=0. With selector1=0, the received data from data buffer 44 is passed by the multiplexer 106. Following, since the BC/4+0.25Tc is low at the rising edge of the LC/4+3.5 cycles signal as depicted at reference numeral 150, selector2=0. With selector2=0, the received data from the multiplexer 106 is passed by the multiplexer 108 and loaded into the third register 106 as REG3 data at the rising edge of the local clock as illustrated at reference numeral 146. The first register 100 receives the received data from the data buffer 44 at the rising edge of the bus clock after the target cycle time has expired. Also, the second register 102 receives the received data from the data buffer 44 at the falling edge of the bus clock after the target cycle time has expired. Thereby, while the received data does load into the first register 100 and second register 102, the REG1 data and REG2 data are not selected by either multiplexer to pass to the third register 106.

Figure 17:
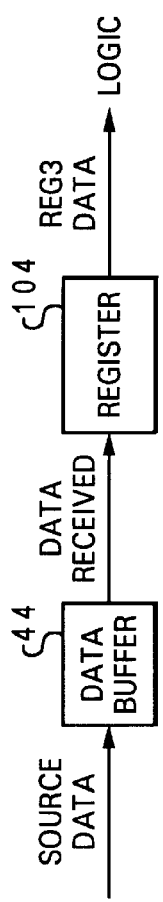
FIG. 17 is a more detailed block diagram depicting the M segment subset of the dynamic shift register of FIG. 11 utilized in FIG. 16.

Referring now to FIG. 17, there is depicted a more detailed block diagram of the one segment subset of the three segment dynamic shift register 40 which are utilized under the conditions detailed in FIG. 16. Since the first data (a) is received in the third phase, the data must be passed directly from the data buffer 44 to the third register 106. By bypassing the first register 100 and second register 102, the first data (a) is loaded into the third register 104 and made accessible to the data sink 14 at a controllable predetermined time even thought the bus clock signal has not been received. The predetermined time in the present illustration is at the bus cycle after the target cycle time.

Upon reference to the foregoing, those skilled in the art will appreciate that the applicants herein have provided a novel method and system whereby bus cycle times can be decreased in order to increase the speed of data transfer from a data source to a data sink. In the method, allowing data to be received over a range of bus cycles can decrease bus cycle times. In receiving data over a range of bus cycles, an N segment dynamic shift register is implemented to selectively pass the data. It is appreciated that as the number of cycles of variation increases, the number of shift registers needed will increase. However, by utilizing the received bus clock signal and the local clock of the data sink, the data can be shifted through an M segment subset of N shift registers to allow the data to be available at a controllable predetermined time.

While the invention has been particularly shown and described with reference to a preferred embodiment, it will be understood by those skilled in the art that various changes in form and detail may be made therein without departing from the spirit of the invention.

What is claimed is:

1. A method of data transfer from a data source to a data sink, wherein said data source and said data sink each comprise a clock, said method comprising the steps of:
   sending first data from said data source to said data sink;
   sending a bus clock signal from said data source to said data sink;
   receiving said first data at said data sink;
   receiving said bus clock signal at said data sink;
   passing selectively said first data through an M segment subset of an N segment shift register, where M is less than N, where N is at least 2, where the length of the M segment subset is determined by the phase of a clock within said data sink at the time which said bus clock signal is received from said data source at said data sink, such that said first data is accessible at said data sink at a controllable predetermined time; and synchronizing said clocks of the data source and the data sink to a common frequency and starting point, each of said clocks outputting a local clock signal.

2. The method of data transfer from a data source to a data sink of claim 1, wherein passing selectively said data through an M segment subset of an N segment shift register further comprises the steps of:

loading said first data received at said data sink when enabled into a predetermined segment of said M segment subset of said N segment shift register; and loading said first data from said predetermined segment when enabled into any remaining predetermined segments of said M segment subset of said N segment shift register.

3. The method of data transfer from a data source to a data sink of claim 2, wherein loading said first data received at said data when enabled into a predetermined segment of said M segment subset of said N segment shift register, and loading said first data from said predetermined segment when enabled into any remaining predetermined segments of said M segment subset of said N segment shift register further comprises the steps of:

enabling said N−1 predetermined segments for loading by said received bus clock signal, and enabling said Nth predetermined segment for loading by said local clock signal.

4. The method of data transfer from a data source to a data sink of claim 1, wherein passing selectively said first data through an M segment subset of an N segment shift register where M is determined by the phase of a clock within said data sink at the time when said bus clock signal is received from said data source at said data sink further comprises the steps of:

shifting the phase of said bus clock signal at said data sink;

lengthening said shifting bus clock signal;

shifting the phase of said local clock signal at said data sink;

loading said shifted and lengthened bus clock signal into a register at the rising edge of the shifted local clock signal;

outputting a selector signal from said register; and selecting a data input to a multiplexer based on said selector signal, where if said selector signal is high, the data passes through a predetermined segment prior to said multiplexer, and if said selector signal is low, the data passes over said predetermined segment prior to the multiplexer where said predetermined segment passed over is not included in the M segment subset.

5. A data sink for receiving data from a data source where said data source and said data sink each contain clocks synchronized to a common frequency, said data sink comprising:

a buffer for receiving first data at said data sink from said data source;

a control circuit for receiving a bus clock signal at said data sink from said data source; said control circuit including a register for loading the bus clock signal at a predetermined phase of said clock, where said register outputs a selector signal, which represents the phase of said clock during which said bus clock signal from said data source is received at said data sink; and an N segment dynamic shift register, where N is at least 2;

shifting means for selectively passing, said first data through an M segment subset of said N segment shift register, where M is determined by the phase of a clock within said data sink at the time which said bus clock signal from said data source is received at said data sink, such that said first data is accessible at said data sink at a controllable predetermined time.

6. The data sink for receiving data from a data source of claim 5, wherein said clock within said data sink is a local clock signal which is lengthened in duty cycle.

7. The data sink for receiving data from a data source of claim 6, wherein said local clock signal is divided by 2.

8. The data sink for receiving data from a data source of claim 6, wherein said local clock signal is divided by 4.

9. The data sink for receiving data from a data source of claim 6, wherein said local clock signal is divided by 4 and shifting by 3.5 local clock cycles.

10. The data sink for receiving data from a data source of claim 5, wherein said bus clock signal is divided by 2 and shifted by 0.25Tc before loading into said register.

11. The data sink for receiving data from a data source of claim 5, wherein said bus clock signal is divided by 4 and shifted by 0.25Tc before loading into said register.

12. The data sink for receiving data from a data source of claim 5, wherein said shifting means further comprises:

a multiplexer for determining the M segments through which said first data passes where said first data is passed through a segment if the selector signal input to said multiplexer following said segment is high.

13. The data sink for receiving data from a data source of claim 5, wherein said predetermined time is a bus cycle after a target cycle time before which the data is received at said buffer at said data sink.

14. The data sink for receiving data from a data source of claim 5, wherein said first data is received at said buffer at said data sink over a range of said bus clock cycles in said data sink.

15. The data sink for receiving data from a data source of claim 14, wherein said range of bus clock cycles is divided into N phases.

16. A data sink comprising:

means for receiving data at a data sink buffer;

means for receiving a bus clock signal at said data sink; and means for storing said data in a destination segment in a data sink shift register having multiple segments, wherein said data selectively bypasses, according to a timing of said receipt of said first data and said bus clock signal, at least one segment in said shift register before being stored in said destination segment.

17. A method of receiving data at a data sink, said method comprising:

receiving data at a data sink buffer;

receiving a bus clock signal at said data sink; and storing said data in a destination segment in a data sink shift register having multiple segments, wherein said data selectively bypasses, according to a timing of said receipt of said first data and said bus clock signal, at least one segment in said shift register before being stored in said destination segment.

* * * * *

UNITED STATES PATENT AND TRADEMARK OFFICE
CERTIFICATE OF CORRECTION

PATENT NO. : 6,442,223 B1
DATED : August 27, 2002
INVENTOR(S) : Dreps et al.

It is certified that error appears in the above-identified patent and that said Letters Patent is hereby corrected as shown below:

Column 13,
Line 23, please insert -- sink -- between "data when."

Column 14,
Line 15, "0.25Tc" should be replaced with -- 2.5Tc --.

Signed and Sealed this

Tenth Day of June, 2003

JAMES E. ROGAN
*Director of the United States Patent and Trademark Office*